US012764496B2

(12) United States Patent
Fröhlich et al.

(10) Patent No.: US 12,764,496 B2
(45) Date of Patent: Oct. 13, 2026

(54) UNSUPERVISED PROGRAMMATIC LABELING FOR TRANSITIONAL INTERVAL IN SMART LOGISTICS

(71) Applicant: Dell Products L.P., Round Rock, TX (US)

(72) Inventors: Herberth Birck Fröhlich, Florianópolis (BR); Paulo Abelha Ferreira, Rio de Janeiro (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 921 days.

(21) Appl. No.: 18/155,544

(22) Filed: Jan. 17, 2023

(65) Prior Publication Data

US 2024/0244396 A1 Jul. 18, 2024

(51) Int. Cl.

| | |
|---|---|
| ***H04W 4/029*** | (2018.01) |
| ***G06N 3/088*** | (2023.01) |
| ***G06N 3/0895*** | (2023.01) |
| ***H04L 41/16*** | (2022.01) |

(52) U.S. Cl.

CPC ............ *H04W 4/029* (2018.02); *G06N 3/088* (2013.01); *G06N 3/0895* (2023.01); *H04L 41/16* (2013.01)

(58) Field of Classification Search

CPC ..... G06N 3/088; G06N 3/0895; H04W 4/029; H04W 4/16

See application file for complete search history.

(56) References Cited

U.S. PATENT DOCUMENTS

| | | | | |
|---|---|---|---|---|
| 9,733,088 | B2 * | 8/2017 | Sen | G01S 5/02526 |
| 11,611,451 | B1 * | 3/2023 | Meingast | H04L 67/535 |
| 2015/0347895 | A1 * | 12/2015 | Glickfield | H04W 4/21 706/16 |
| 2020/0068350 | A1 * | 2/2020 | Chai | G06F 17/18 |
| 2021/0094577 | A1 * | 4/2021 | Shalev-Shwartz | G05D 1/0246 |
| 2021/0105578 | A1 * | 4/2021 | Chen | H04R 1/32 |
| 2022/0007137 | A1 * | 1/2022 | Choi | H04W 4/025 |
| 2022/0026519 | A1 * | 1/2022 | Wu | G01S 7/006 |
| 2022/0382845 | A1 * | 12/2022 | Budman | G06N 3/091 |

OTHER PUBLICATIONS

Georgiou, Harris, et al. "Moving objects analytics: Survey on future location & trajectory prediction methods." arXiv preprint arXiv:1807.04639 (2018). (Year: 2018).*

U.S. Appl. No. 17/663,423, titled.

Snorkel AI | Data-centric AI for the enterprise (https://snorkel.ai/).

* cited by examiner

*Primary Examiner* — Andrew L Tank

(74) *Attorney, Agent, or Firm* — Workman Nydegger

(57) ABSTRACT

One example method includes collecting trajectories from each edge device in a group of edge devices, extracting a respective latent space vector from each trajectory, evaluating the latent space vectors to identify a respective set of one or more transitional intervals corresponding to each of the latent space vectors, and labeling the transitional intervals. The trajectories include information about the movement of the edge devices within a domain, and the labels on the transitional intervals indicate whether, and to what extent, the movement of the edge devices conforms to expected movements.

20 Claims, 5 Drawing Sheets

300

```
init_hash(table):

      hash = { } # {med_id:(time, state, ti)}
      first_vectors = table.groupby('med_id').first()
      for timestamp, med_id, v in first_vectors:

            dist1, dist2 := get_cluster_dists (med_id, v)

            hash[med_id] := (curr_time, 'Normal', 'False')

      return hash

get_state(dist1, dist2) :

      if dist1 <= 0:

            return 'Normal'

      elif  dist2 > 0:

            return 'Abnormal'

      else:

            return 'Attention'
```

FIG. 3

400

```
table.sort_by('timestamp')

init_hash (table)

table := drop_first_vectors(table)
med_tis = {}

for med_id in table.med_id.unique():
     table_med = table.where(med_id=med_id)

     med_tis[med_id] := find_transit_intervals(table_med)
```

FIG. 4

500

```
find_transit_intervals (table_med, hash):

  for curr_time, med_id, z in table_med.get('vector')
    (prev_time, prev_state, prev_ti) = hash[med_id]
    dist1, dist2 := get_cluster_dists (med_id, z)
    curr_state = get_state(dist1, dist2):

    curr_ti := False

    if curr_state == 'Abnormal:

       curr_ti := True

    if prev_state == 'Normal':

      beg := prev_time

    elif curr_state == 'Normal' and prev_ti:

        end := curr_time

       store_ti(med_id, beg, end)

    hash[med_id] = (curr_time, curr_state, curr_ti)
```

FIG. 5

UNSUPERVISED PROGRAMMATIC LABELING FOR TRANSITIONAL INTERVAL IN SMART LOGISTICS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present invention generally relate to the behavior of edge devices in an edge computing environment. More particularly, at least some embodiments of the invention relate to systems, hardware, software, computer-readable media, and methods, for identifying various parameters and values concerning the behavior of an edge device, and using the parameter values to modify the behavior of the edge device.

BACKGROUND

Much attention has been directed recently to the need for solutions to the rising AI/ML and infrastructure needs of the edge, that is, edge computing environments. A promising edge space to work on is smart services for mobile edge devices in the logistics domain. Trajectory data from these mobile device trajectories may be leveraged by ML to optimize operations or to address dangerous circumstances via object/event detection approaches.

However, problems currently exist with the need to provide decision support to the detection of anomalous events. A particular problem is sometimes referred to as the governability issue, and concerns the need to be able to provide reproducibility and traceability of an unsupervised labelling process. For example, consider a case where there is an unsupervised model deployed to mobile edge devices. In such a case, it may be difficult to determine where, when, and how much, the edge device behaviors have diverged from some standard, or from expected behavior. This is due in part to the fact that there is typically a lack of labels for this divergent behavior, and it may be expensive and impractical to produce the labels, particularly where the datasets comprising the behavioral information are often large, and diverse.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 is an example algorithm for defining auxiliary functions, according to one embodiment.

FIG. 4 is an example algorithm for finding transitional intervals for mobile edge devices, according to one embodiment.

FIG. 5 is an example algorithm for orchestrating the operations disclosed in the example of FIG. 4, according to one embodiment.

DETAILED DESCRIPTION OF SOME EXAMPLE EMBODIMENTS

Figure 1:
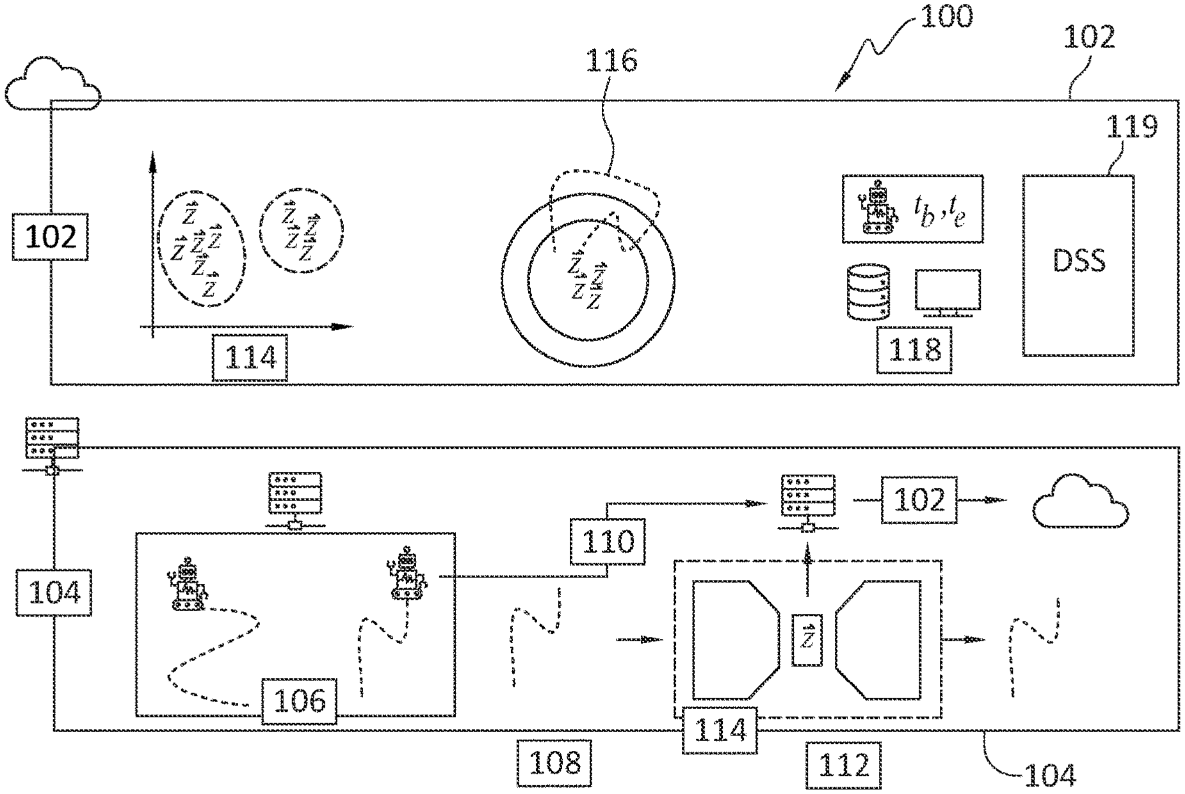
FIG. 1 discloses aspects of an architecture and method for gathering and evaluating edge device trajectories, according to one embodiment.

Embodiments of the present invention generally relate to the behavior of edge devices in an edge computing environment. More particularly, at least some embodiments of the invention relate to systems, hardware, software, computer-readable media, and methods, for identifying various parameters and values concerning the behavior of an edge device, and using the parameter values to modify the behavior of the edge device.

In general, an example embodiment of the invention may comprise the collection of information concerning respective trajectories of mobile edge devices that may be operating in an edge computing environment. This information may then be evaluated to identify transitional intervals, that is, time periods between the beginning and end of anomalous behavior occurring during a trajectory of a mobile edge device. The transitional intervals may take any of a variety of different forms. Depending upon their form, one or more of the transitional intervals may, in one embodiment, be used as a basis to inform an entity, such as a human and/or a computing system, of abnormal behavior by one or more of the mobile edge devices.

One particular example embodiment may operate to extract a time interval during which a mobile device is behaving in an unexpected manner with respect to its trajectories in a warehouse. This approach may contribute to saving time and cost in terms of autonomous device safety and predictive maintenance and process adaptation. The main challenge involved in this task is the lack of labels for dangerous/anomalous behavior and the high cost involved in producing them given the large size of datasets involving trajectories collected through time form many different devices in different warehouses. Thus, an example embodiment may operate to generate such labels.

Note that this warehouse logistics example, also referred elsewhere herein in the interest of illustrating aspects of an example embodiment, is presented only by way of illustration and is not intended to limit the scope of the invention in any way. More generally, one or more embodiments be concerned with various edge device attributes, one example of which is the mobility of the edge device. As noted in the warehouse logistics example, one example edge device is a forklift that is able to move about in the warehouse. The scope of the invention is not limited to forklifts however, and those are presented only by way of example.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that the embodiment may operate to determine whether, where, when, and/or, how, a behavioral aspect of an edge computing device deviates from one or more guidelines. An embodiment may operate to identify anomalous behavior of an edge computing device. An embodiment may enable identification and implementation of a remedy to reduce, or eliminate, anomalous behavior of an edge computing device. An embodiment may use an unsupervised method to generate labels for edge device behaviors. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

The following is an overview of some aspects of an example embodiment of the invention. This discussion is not intended to limit the scope of the invention, or the applicability of the embodiments, in any way.

In general, an embodiment may comprise a programmatic labeling framework to deal with governability, that is, the reproducibility and traceability of an event labelling process. An embodiment may be particularly useful in identifying where, when, and how much the behavior of edge devices, such as mobile edge devices (MEDs) for example, have diverged in terms of their trajectories. On example scenario is disclose in FIG. 1.

In general, one embodiment of the invention may comprise two processes, both of which are discussed in further detail below. The first process may comprise the collection of trajectories and their latent representations at the edge nodes. The second process may comprise the identification and storage of transitional intervals at a central node. The resulting identifications may be leveraged by a decision support system.

Turning now to the illustrative example of FIG. 1, there is disclosed an environment 100 that may comprise a central node 102, and one or more edge nodes 104 that may be able to communicate with the central node 102. In an embodiment, an edge node 104 may comprise a warehouse in which edge devices, such as forklifts, operate. A forklift is one example of an MED.

In general, and as disclosed in FIG. 1, trajectories for one or more MEDs may be gathered at each edge node 104, such as a warehouse, and latent representations may be gathered and clustered centrally at the central node 102 so that any anomalous MED behavior may be identified and assessed, and transitional intervals stored.

In brief, FIG. 1 discloses the continuous collection of trajectories from MEDs 106 at each edge node 104 which, as noted, may comprise a warehouse. The warehouse may, in one embodiment, take the form of, or comprise, an edge computing environment. For each trajectory 108 of an MED 106, an embodiment may also collect 110 latent representations 112, which may be periodically sent to the central node 102. In the example of FIG. 1, the latent representation z" may be obtained with an autoencoder neural network 114, or simply an 'autoencoder.'

In general, an autoencoder, which is one form of a neural network, may receive data, such as trajectory data for example, and then compress and encode the data. The autoencoder may then attempt to reconstruct, using the encoded representation of the data, the data that was initially received. As part of a training process, the autoencoder may repeat the encode-decode process or procedure until such time as the loss, that is, the difference between the original data, and the data reconstructed from the encoded data, is minimized or until the loss is reduced to a predetermined acceptable level.

With continued reference now to FIG. 1, in an encode-decode procedure such may be implemented by the autoencoder 114, the encoding stage of the autoencoder 114 may produce a latent space vector, which may comprise a reduced, or condensed, representation of the inputs, that is, the trajectories received from an MED for example, in which only structural similarities between the input data and the data extracted from the encoded data representation are kept. A latent space vector may sometimes be referred to as a latent space representation. This latent space representation may comprise one or more latent variables, that is, variables that can only be inferred indirectly. Elements may be drawn from this latent space to define and build a latent vector. In this way, an embodiment may make the trajectory data more understandable to users.

Thus, a latent representation of a trajectory, such as an MED trajectory for example, may comprise a vector composed of a reduced number of features obtained by encoding, or a similar procedure, characteristic of the operation, in time, of a certain asset such as an MED. Such features may include, for example, the start time and end time of a trajectory, and an extent to which a trajectory may have deviated from an expected or planned trajectory. Note that that only the feature dimension of a trajectory may be reduced, while the number of observations remains the same. Finally, trajectory may not only be related to a displacement in time, but also to operational trajectories of an asset.

With continued reference now to FIG. 1, at the central node 102, an embodiment may cluster the latent representations 114 and monitor the latent representations 114 for anomalous behavior, such as when an MED strays from an expected travel path through a warehouse. As a result of the monitoring, one or more transitional intervals 116 may be identified. These transitional intervals 116 may then be stored at a cloud database 118 and may be accessed for monitoring or maintenance processes, such as by logistics experts, for decision support. Finally, a decision support system (DSS) 119, which may or may not be implemented at the central node 102, may evaluate transitional intervals, and define and implement various actions, including remedial actions, as guided by the characterizations of the transitional intervals.

As explained above, and disclosed elsewhere herein, an embodiment may comprise various aspects. For example, an embodiment may comprise an unsupervised method to programmatically label abnormal behavior events stored and indexed as transitional intervals. As another example, an embodiment may comprise a decision support method to monitor and store transitional intervals to improve governability, that is, to help reproducibility and traceability of the labeling process by identifying anomalous behavior by an edge device.

B. Detailed Discussion of Some Example Embodiments

Embodiments of the invention may be implemented in a variety of different contexts. By way of illustration, one particular embodiment of the invention may be applicable to a logistics domain. This particular embodiment is presented for the purposes of illustration and is not intended to limit the scope of the invention in any way.

In this illustrative case, the logistics domain may comprise multiple mobile edge devices (MED) in warehouses with deployed Machine Learning (ML) models configured, and operable, to detect MED trajectory events. Some examples of trajectory events include, but are not limited to: (1) the detection of dangerous cornering events, such as by a forklift for example, that might lead to crashes or toppling over; and (2) the classification of typical trajectories of loading/unloading pallets into vehicles.

B.1 Mobile Edge Device (MED) Latent Trajectory Collection

As used herein, 'trajectories' include, but are not limited to, sets of contiguous positional and/or other data, such as inertial data for example, collected by each MED as it moves around in an environment, such as a warehouse for example. An embodiment may comprise a method operable to cut the MED movement data into discrete trajectories. One or more embodiments of such a method are disclosed in: U.S. patent application Ser. No. 17/663,423, titled "UNSUPERVISED LEARNING FOR REAL-TIME DETECTION OF EVENTS OF FAR EDGE MOBILE DEVICE TRAJECTORIES," filed 14 May 22, which is incorporated herein in its entirety by this reference. In an embodiment, these trajectories may then be fed to an ML model that may be operable to classify the trajectories and/or predict events of interest relating to the trajectories.

One embodiment of the invention may employ an autoencoder ML model, as noted above in the discussion of FIG. 1. However, any other ML models may be employed that provide internal features/functions, such as the latent space of an autoencoder, and that are operable to encode an input such as a trajectory. In an embodiment, each MED may perform inferencing with its own respective autoencoder, while in another embodiment, inferencing for a group of edge devices may be performed by a near edge device in communication with those edge devices. That is, in an embodiment, some simple operations may be performed by each ML model, namely, performing inference up to the latent space, and then periodically sending the results of the inferencing to the near edge, or directly to the central node.

In an embodiment, the first stage of a method may comprise the collection of latent space vectors data for each trajectory taken by each MED at each warehouse. These latent space vectors data may be periodically sent back from the MEDs to a near edge node, or directly to a central node. Each latent space vector may be associated with metadata such as, but not limited to, a given timestamp for the start of its trajectory, an MED ID (identification) that uniquely identifies a particular MED, and a warehouse ID that uniquely identifies a warehouse or other environment where the MED operates. Through the use of such metadata, an embodiment may be able to trace the MED back in time (timestamp), and space (MED ID, warehouse ID), to enable decision support for logistics technical specialists.

The duration of the collection stage may be automatically determined, or specified by a specialist, which may be a human or a computing system, with expert knowledge in the task(s) performed by the MEDs in the logistics space. The duration of the collection stage may also depend on the resources available to store and communicate such data. The final product of the collection stage may comprise a dataset of latent space vectors and respective associated metadata, where each latent space vector may represent a particular respective MED trajectory.

B.2 Transitional Intervals Identification

In an embodiment, the second stage of a method, which may include the first stage discussed immediately above, may comprise the generation of a set of transitional intervals (TI). In an embodiment, a transitional interval represents the beginning and end of an anomalous behavior event that occurred during a trajectory of a MED, that is, from the start of an anomalous behavior event to the return of the MED to normal behavior. It might be the case that a MED follows an anomalous trajectory up to the time a user is consulting the system and, in such cases, an embodiment may provide one or more open transitional intervals that may serve as alert as to straying behavior by an MED. That is, at the time the user is consulting the system, the MED may be following an anomalous trajectory, which may then be reported.

A first operation of the second stage may be to cluster all the latent space vectors gathered during the stage of MED latent trajectory collection. A specialist might know, or the particular task might impose, a fixed number of clusters that may be used in the clustering method. An embodiment may use agnostic clustering techniques that try to guess the correct number of clusters. There is a variety of clustering methods and the scope of the invention is not limited to the aforementioned examples.

As the trajectories are recorded over time, their corresponding latent space vectors may also follow paths through time, but in the latent abstract space. When an embodiment performs clustering in these latent vectors, the result of the clustering may be a grouping that represent the normative behavior, at least for the duration of the collection period, and implicit boundaries.

With respect to such boundaries, an embodiment may define a given distance from the centroid of a cluster of latent space vectors as a first limiting boundary and another distance from that centroid as the final boundary. For example, the first distance may be one standard deviation, and the second distance may be two standard deviations, away from the cluster centroid.

Figure 2:
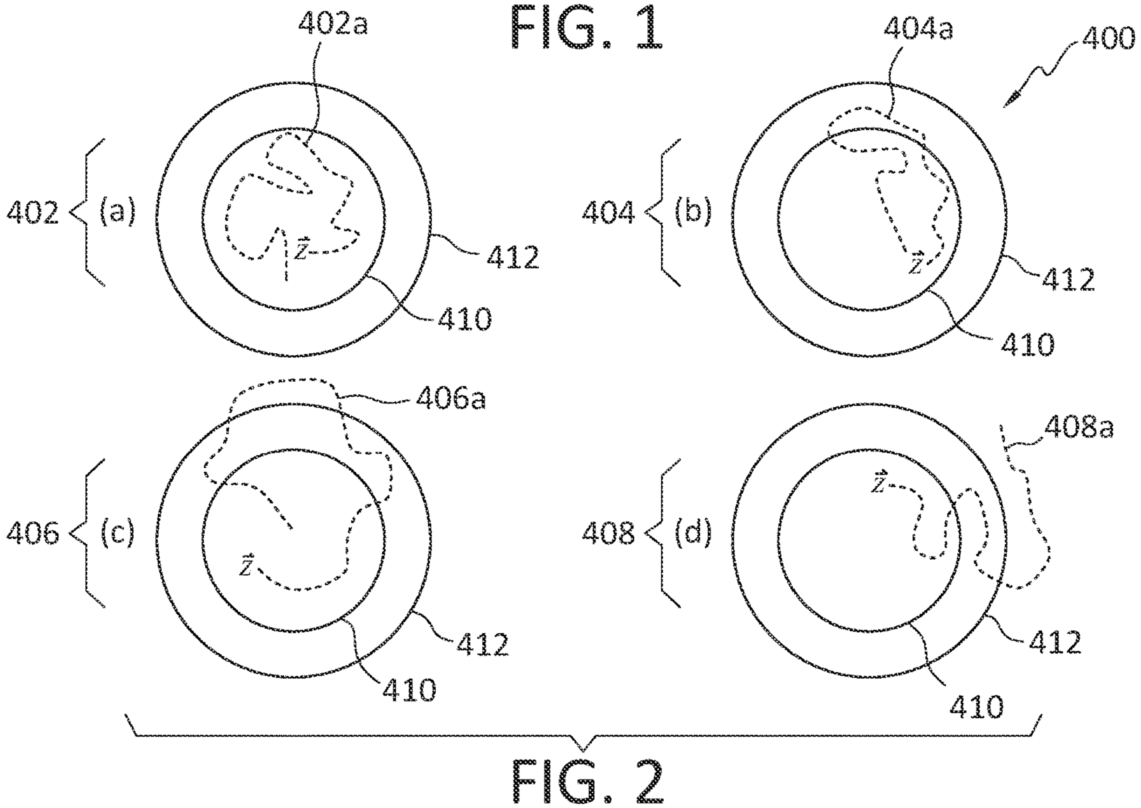
FIG. 2 discloses some example representative cases for identifying transitional intervals for edge device trajectories, according to one embodiment.

A second operation, performed after the clustering of latent space vectors, of the second stage may comprise signaling, by the central node for example, to the edge nodes that the central node is ready and able to perform transitional interval identification. After this signaling, the edge nodes may then start to collect new trajectory data with latent space vectors and send the latent space vectors back to the central node. These are the latent vectors that may be used for transitional interval identification, as shown in FIG. 2. Once the cluster information has been obtained, in the first operation of the second stage, an embodiment may then identify latent vectors that move beyond the first and second boundary of a given cluster form which the latent vector(s) originated.

In general, FIG. 2 discloses four representative cases, generally denoted at 400, for identifying transitional intervals in a latent space vector. Particularly, there are four cases 402, 404, 406, and 408, each of which has an associated latent space vector 402*a*, 404*a*, 406*a*, and 408*a*. Each of the cases 402-408, may have a respective first boundary 410 and a second boundary 412.

The particular cases 402-408 disclosed in FIG. 2 include the following: (a) the latent space vector 402*a*, or simply 'vector,' moves, and remains, within the first boundary 410—this may represent normative behavior of an MED; (b) the vector 404*a* crosses the first boundary 410, but not the second boundary 412—this represents varying, but still normative, behavior of an MED; (c) the vector 406*a* moves out of the second, or outer, boundary 412, and then returns to within the second boundary 412, and then within the first boundary 410—this case may be particularly relevant to a method for transitional interval identification; and, (d) straying behavior of the vector 408*a*, with no return—during the maximum permissible elapsed time—to either the second boundary 412 or the first boundary 410—this case may represent some form of drift or error in the domain, and one or more new or modified approaches may be defined to deal with this case.

According to one embodiment, a method for transitional interval identification may run offline, with a delay in relation to the actual trajectories being taken by the MEDs at the edge. This is not an issue since, in one implementation at least, the method may serve as a decision support system for a specialist to evaluate MED behavior, rather than an online adaptable method.

An embodiment may assume that the latent space vectors are gathered and indexed by timestamp, that is, by the timestamps that respectively correspond to the start of each related trajectory. This approach may lend itself naturally to the construction of a sorted data structure where the evolution of a given latent vector through time may be readily consulted. For example, the data structure may be configured as a table containing the group (med_id, timestamp, vector). Then, the table may be sorted by timestamp and the timestamps grouped by med_id in order to be able to efficiently consult each set of MED latent vectors sorted by timestamp.

In an embodiment, the method may run through all MEDs, possibly in parallel if adequate processing and storage resources are available and, for each MED, its latent vectors may be followed through time and a check performed for transitions between, for example, Normal (within the first cluster boundary), Attention (between the first and second cluster boundaries), and Abnormal (outside the second boundary). Note that as used herein, an embodiment defines a transitional interval as occurring, or having occurred, when a vector goes into the Abnormal state but then returns to the Normal state.

During all of the MED trajectories through time, there might be zero, one or many, transitional intervals. This intuition is captured in some example pseudocode pieces, addressed below. Note that in, the pseudocode, dist1 refers to the distance between a vector and the first boundary distance, and dist2 refers to the distance between a vector and the second boundary distance.

B.3 Example Pseudocode/Algorithms

With reference now to FIGS. 3-6, various examples of pseudocode 300, 400, 500, and 600, for implementing aspects of one or more embodiments are disclosed. FIG. 3 discloses an algorithm 300 for the definition of auxiliary functions, including distances between a vector and various boundaries. FIG. 4 discloses an example algorithm 400 for the implementation of a method to go through all MEDs and find transitional intervals. Finally, FIG. 5 discloses an example algorithm 500 for finding transitional intervals. Note that the algorithm 400 in FIG. 4 comprises the orchestration of the algorithm 500, applied to all MEDs. Note as well that the algorithm 300 in FIG. 3 may be auxiliary to the algorithm 500.

B.4 Decision Support System

An embodiment may comprise, or interact with, a decision support system that uses the stored transitional intervals to inform, such as by way of a user interface (UI) comprising a GUI and/or CLI for example, a specialist in the logistics domain about abnormal behavior in the operating MEDs. The Attention and Abnormal states may serve overall to alert for conditions such as, but not limited to, misbehaving, defects, or drifting behavior, by an MED. Stored and indexed transitional intervals may help to guide decisions, and may enable the identification of MED behavior in an efficient manner, since it possible to build, upon a system according to one embodiment, various systems and interfaces that make use of the structures included in one or more embodiments. Thus, an embodiment of the invention may comprise the creation of abnormal behavior labeling in a programmatic and automatic manner. Furthermore, an embodiment may lend itself for use as a protocol for continuous identification, with its two stages of normal behavior collection and abnormal behavior identification. Finally, an embodiment may comprise an efficient and scalable system with the main method, an example of which is disclosed in FIG. 5, possibly running in parallel for each MED, if adequate computing resources are available.

C. Example Methods

Figure 6:
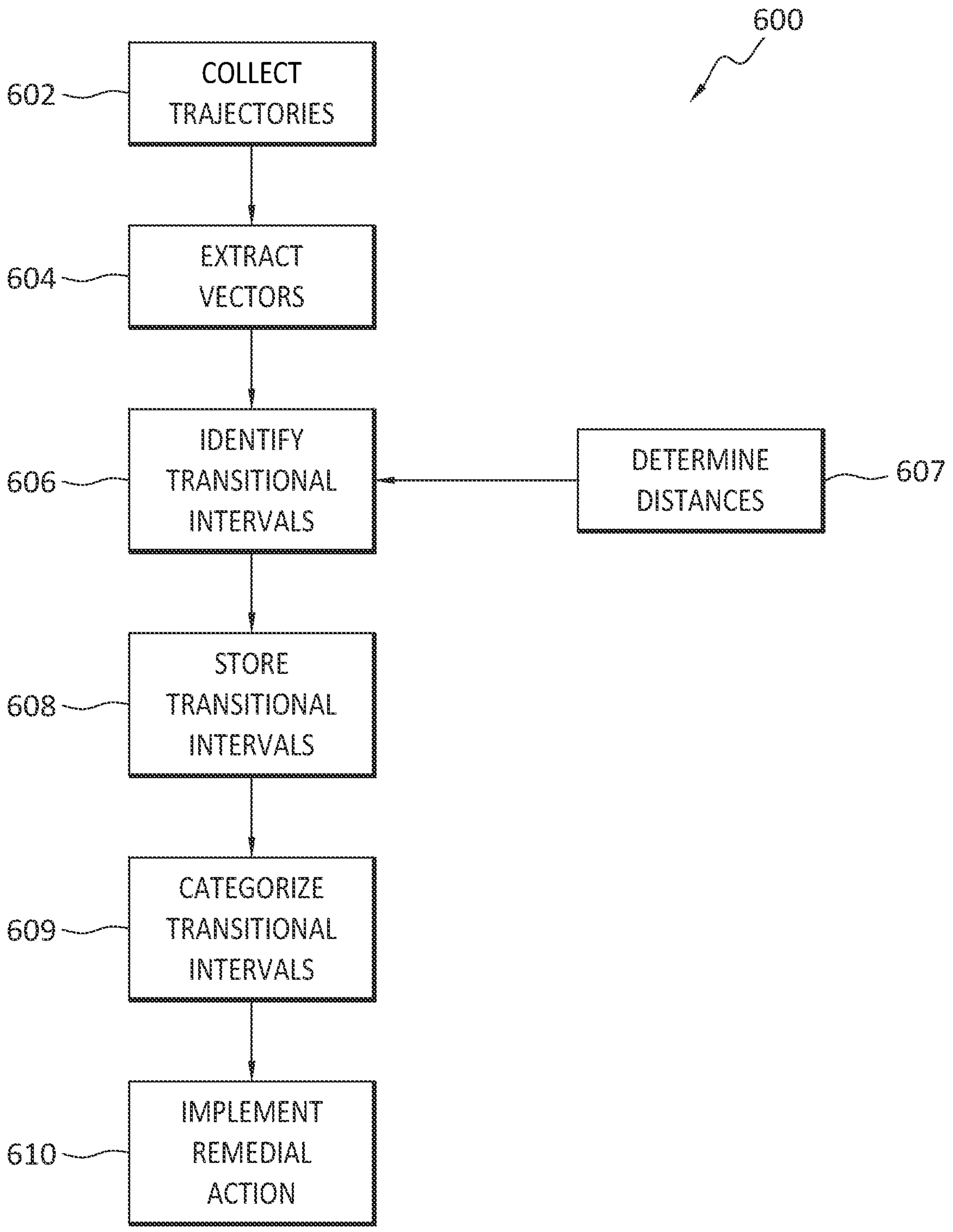
FIG. 6 is an example method according to one embodiment.

It is noted with respect to the disclosed methods, including the example method of FIG. 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method according to one embodiment is denoted generally at 600. In an embodiment, the method 600 may be performed in whole, or in part, by a group of edge nodes and/or by a central node with which the edge nodes are able to communicate.

The example method 600 may begin with the collection of trajectories 602 from each of one or more edge devices that collectively form part of an edge computing environment. In an embodiment, one or more of the edge devices may be mobile within its respective domain. An edge device may comprise, in an embodiment, a forklift or other vehicle. The collection of the trajectories 602 may be performed by the edge devices and/or by a central node.

After the trajectories have been collected 602, a respective latent space vector may be extracted from each trajectory 604. The latent space vectors, and associated respect distances between the latent space vectors and one or more boundaries, may be used to identify one or more transitional intervals 606 for one or more of the edge devices. The distance information may be generated by a separate process 607 which may run before, during, or after, the operations 602, 604, and 606. Note that the identification of the transitional intervals 606 may be performed offline and the transitional intervals fed to a decision support system, which may be hosted at a central node for example, for evaluation and action.

After the transitional intervals have been identified, they may be stored 608, such as in a data structure for example. The data structure may be configured to enable sorting of the transitional intervals according to various parameters. The stored transitional intervals may be accessible from the data structure. After the transitional intervals have been stored 608, they may be labeled 609. For example, a transitional interval may be labeled 609 as one of Normal, Attention, or Abnormal.

The labeled transitional intervals may then be evaluated, such as by a decision support system and, based on the outcome of the evaluation, corresponding remedial action(s) may be implemented 610, such as by the decision support system. The evaluation may comprise determining the category for a transitional interval and if the category is Normal, no further action may be needed. On the other hand, if a transitional interval has a category of Attention, the transitional interval, and associated MED, may be referred to the decision support system and/or to an administrator for evaluation/action. Finally, if a transitional interval has a category of Abnormal, the MED and transitional interval may be referred, such as to a decision support system, for implementation of a remedial action 610.

D. Further Example Embodiments

Following are some further example embodiments of the invention. These are presented only by way of example and are not intended to limit the scope of the invention in any way.

Embodiment 1. A method, comprising: collecting trajectories from each edge device in a group of edge devices; extracting a respective latent space vector from each trajectory; evaluating the latent space vectors to identify a respective set of one or more transitional intervals corresponding to each of the latent space vectors; and labeling the transitional intervals.

Embodiment 2. The method as recited in embodiment 1, wherein one or more of the edge devices comprises a respective mobile edge device operable to move within a domain.

Embodiment 3. The method as recited in any of the preceding embodiments, wherein each of the trajectories comprises information about the movement of one of the edge devices.

Embodiment 4. The method as recited in any of the preceding embodiments, wherein the transitional intervals are labeled according to whether or not, and to what extent, the edge device, to which the transitional interval corresponds, is moving as expected within a domain of the edge device.

Embodiment 5. The method as recited in any of the preceding embodiments, wherein each of the latent space vectors comprises a subset of information contained in a respective trajectory.

Embodiment 6. The method as recited in any of the preceding embodiments, wherein an alert is transmitted when a label of one of the transitional intervals has a particular identity.

Embodiment 7. The method as recited in any of the preceding embodiments, wherein a remedial action is implemented with respect to one of the edge devices when a label of one of the transitional intervals relating to that edge device has a particular identity.

Embodiment 8. The method as recited in any of the preceding embodiments, wherein the transitional intervals are stored by a decision support system after the transitional intervals have been identified.

Embodiment 9. The method as recited in any of the preceding embodiments, wherein the transitional intervals are labeled by a decision support system.

Embodiment 10. The method as recited in any of the preceding embodiments, wherein labeling the transitional intervals comprises labeling one of the transitional intervals as abnormal.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 700, any one or more of the entities disclosed, or implied, by FIGS. 1-6, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

Figure 7:
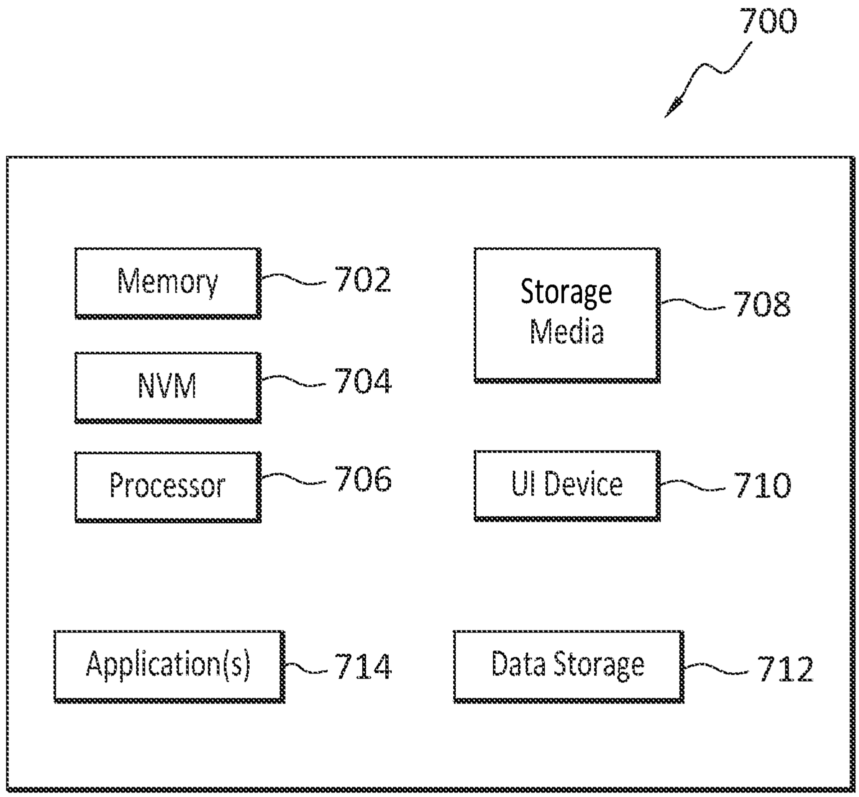
FIG. 7 is an example computing entity operable to perform any of the disclosed methods, algorithms, processes, and operations.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the methods, algorithms, operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

collecting trajectories from each edge device in a group of edge devices, wherein each of the trajectories includes time-series data;

extracting a respective latent space vector from each trajectory, wherein the latent space vector comprises a compressed feature vector representing temporal characteristics of the trajectories;

evaluating the latent space vectors to identify a respective set of one or more transitional intervals corresponding to each of the latent space vectors by clustering the latent space vectors;

signaling to the edge devices that a central node is prepared to perform transitional interval identification using the identified set of one or more transitional intervals, wherein the transitional intervals correspond to anomalous edge device behavior;

collecting new latent space vectors generated at the edge devices;

labelling the new latent space vectors programmatically using the clustered set of one or more transitional intervals;

determining that a new latent space vector is a detected transitional interval when the new latent space vector moves outside of a first boundary associated with the set of one or more transitional intervals and subsequently returns within the first boundary, wherein the first boundary is a statistically determined distance from a centroid of a cluster of the latent space vectors received from the edge devices;

performing a remedial action at the edge devices in response to a detected transitional interval when the detected transitional interval is ongoing and when the detected transitional interval is completed.

2. The method as recited in claim 1, wherein one or more of the edge devices comprises a respective mobile edge device operable to move within a domain.

3. The method as recited in claim 1, wherein each of the trajectories comprises information about movement of one of the edge devices.

4. The method as recited in claim 1, wherein the transitional intervals are labeled according to whether or not, and to what extent, the edge device, to which the transitional interval corresponds, is moving as expected within a domain of the edge device.

5. The method as recited in claim 1, wherein each of the latent space vectors comprises a subset of information contained in a respective trajectory.

6. The method as recited in claim 1, wherein an alert is transmitted when a label of one of the transitional intervals has a particular identity.

7. The method as recited in claim 1, wherein the remedial action is implemented with respect to one of the edge devices when a label of one of the transitional intervals relating to that edge device has a particular identity.

8. The method as recited in claim 1, wherein the transitional intervals are stored by a decision support system after the transitional intervals have been identified.

9. The method as recited in claim 1, wherein the transitional intervals are labeled by a decision support system.

10. The method as recited in claim 1, wherein labeling the transitional intervals comprises labeling one of the transitional intervals as abnormal.

11. A non-transitory storage medium having stored therein instructions that are executable by one or more hardware processors to perform operations comprising:

collecting trajectories from each edge device in a group of edge devices, wherein each of the trajectories includes time-series data;

extracting a respective latent space vector from each trajectory, wherein the latent space vector comprises a compressed feature vector representing temporal characteristics of the trajectories;

evaluating the latent space vectors to identify a respective set of one or more transitional intervals corresponding to each of the latent space vectors by clustering the latent space vectors;

signaling to the edge devices that a central node is prepared to perform transitional interval identification using the identified set of one or more transitional intervals, wherein the transitional intervals correspond to anomalous edge device behavior;

collecting new latent space vectors generated at the edge devices;

labelling the new latent space vectors programmatically using the clustered set of one or more transitional intervals;

determining that a new latent space vector is a detected transitional interval when the new latent space vector moves outside of a first boundary associated with the set of one or more transitional intervals and subsequently returns within the first boundary, wherein the first boundary is a statistically determined distance from a centroid of a cluster of the latent space vectors received from the edge devices;

performing a remedial action at the edge devices in response to a detected transitional interval when the detected transitional interval is ongoing and when the detected transitional interval is completed.

12. The non-transitory storage medium as recited in claim 11, wherein one or more of the edge devices comprises a respective mobile edge device operable to move within a domain.

13. The non-transitory storage medium as recited in claim 11, wherein each of the trajectories comprises information about movement of one of the edge devices.

14. The non-transitory storage medium as recited in claim 11, wherein the transitional intervals are labeled according to whether or not, and to what extent, the edge device, to which the transitional interval corresponds, is moving as expected within a domain of the edge device.

15. The non-transitory storage medium as recited in claim 11, wherein each of the latent space vectors comprises a subset of information contained in a respective trajectory.

16. The non-transitory storage medium as recited in claim 11, wherein an alert is transmitted when a label of one of the transitional intervals has a particular identity.

17. The non-transitory storage medium as recited in claim 11, wherein the remedial action is implemented with respect to one of the edge devices when a label of one of the transitional intervals relating to that edge device has a particular identity.

18. The non-transitory storage medium as recited in claim 11, wherein the transitional intervals are stored by a decision support system after the transitional intervals have been identified.

19. The non-transitory storage medium as recited in claim 11, wherein the transitional intervals are labeled by a decision support system.

20. The non-transitory storage medium as recited in claim 11, wherein labeling the transitional intervals comprises labeling one of the transitional intervals as abnormal.

* * * * *